United States Patent [19]
Wiklof

[11] Patent Number: 5,581,293
[45] Date of Patent: Dec. 3, 1996

[54] METHOD AND APPARATUS FOR ZERO FORM LOSS ON CONTINUOUS FORM PRINTING

[75] Inventor: Christopher A. Wiklof, Everett, Wash.

[73] Assignee: Intermec Corporation, Everett, Wash.

[21] Appl. No.: 47,237

[22] Filed: Apr. 13, 1993

[51] Int. Cl.$^6$ .............................. G03G 21/00; B65H 5/00
[52] U.S. Cl. ......................... 347/139; 347/153; 355/310; 271/225; 271/902
[58] Field of Search ........................ 355/310; 346/153.1, 346/134; 271/902, 225; 347/139, 153

[56] References Cited

U.S. PATENT DOCUMENTS

| | | | |
|---|---|---|---|
| 4,819,024 | 4/1989 | Kagayama et al. | 355/310 |
| 5,019,872 | 5/1991 | Zajac, Jr. | 355/317 |
| 5,041,850 | 8/1991 | Kahoyashi et al. | 346/153.1 |
| 5,061,967 | 10/1991 | Isobe | 355/310 |
| 5,296,906 | 3/1994 | Hano et al. | 355/310 X |

*Primary Examiner*—Peter S. Wong
*Assistant Examiner*—Randy W. Gibson
*Attorney, Agent, or Firm*—Seed and Berry LLP

[57] ABSTRACT

An electrophotographic printer especially for bar code printing having an image transfer drum for placing an image onto a continuous form to be printed moved along a path by a form feed. A fusing roller is located downstream to fix the image on the form. The form is fed along a path past the transfer drum and fusing roller and after printing the last printed form is separated from the continuous form downstream of the image transfer drum leaving a leading edge on the unprinted form. The separation of the printed form is signaled to a controller which disables the image transfer device and fusing roller and causes the form feed to reverse moving the new leading edge upstream to a location immediately adjacent the image transfer drum. Various forms of printing, fixing the image onto the form, feeding the form and various types of forms such as barcoded labels on a carrier continuous form are disclosed. A method of printing and retracting a continuous form to utilize the unprinted portion of a form adjacent the last printed portion of a form at the end of a print run.

13 Claims, 3 Drawing Sheets

METHOD AND APPARATUS FOR ZERO FORM LOSS ON CONTINUOUS FORM PRINTING

TECHNICAL FIELD

This invention relates to continuous form printers, and particularly to the type of printers where the image is transferred to a form moving along a path at one location and fused or fixed to the form at a second downstream location.

BACKGROUND OF THE INVENTION

Continuous form printers of the type which include an image transfer station and then downstream an image fixing station, require that an unprinted portion of the form be fed to pass beyond the image transfer station at the conclusion of a print run. Normally this results in a length of unprinted form waste at the start of each new print run.

Bar code printers frequently are of the continuous form type. Bar code printers also are used to make a large number of relatively short runs so that the amount of unprinted form waste relative to the length of the run is increased.

SUMMARY OF THE INVENTION

It is an object of this invention to reduce waste by utilizing for printing the unprinted form length which normally extends between the image transfer station.

This object is obtained by signaling when the last printed form has had its printed image fixed at the end of a print run and with this signal, disabling the printing and fixing devices from the remainder of the form, and then retracting the form upstream until the retracted portion of the unprinted form is positioned again upstream at the printing station. In the preferred embodiment, the printing device is an electrophotographic printer of the type using a rotating image transfer drum which deposits a toner or dry ink material onto the form in an image formation at an image transfer station. The form is then moved further downstream to a fixing station where the toner or dry powder is permanently attached to the form such as by being fused by passing a heated roller over the printed form to fix the print onto the form. Finally, the remainder of the form is separated from the last printed form of a print run leaving the unprinted form with a new leading edge free from the printed form. In the preferred embodiment, the feed drive is a driven roller and a pinch roller so that by reversing the direction of these rollers, the form may be retracted until the new leading edge is adjacent the upstream end of the image transfer drum. The image transfer station and the fusing station are disabled so that the form may slide freely in the retracted direction and not be affected by the operating equipment at the fusing and image transfer stations.

In the alternative in a label carrying continuous form where labels to be bar coded, for example, are attached in spaced relationship separated along a carrier continuous form, the last printed label is removed from the continuous carrier form leaving the carrier form intact. In this alternative, the carrier form is retracted until the last unprinted label is aligned with the image transfer drum.

DETAILED DESCRIPTION OF THE INVENTION

Figure 1:
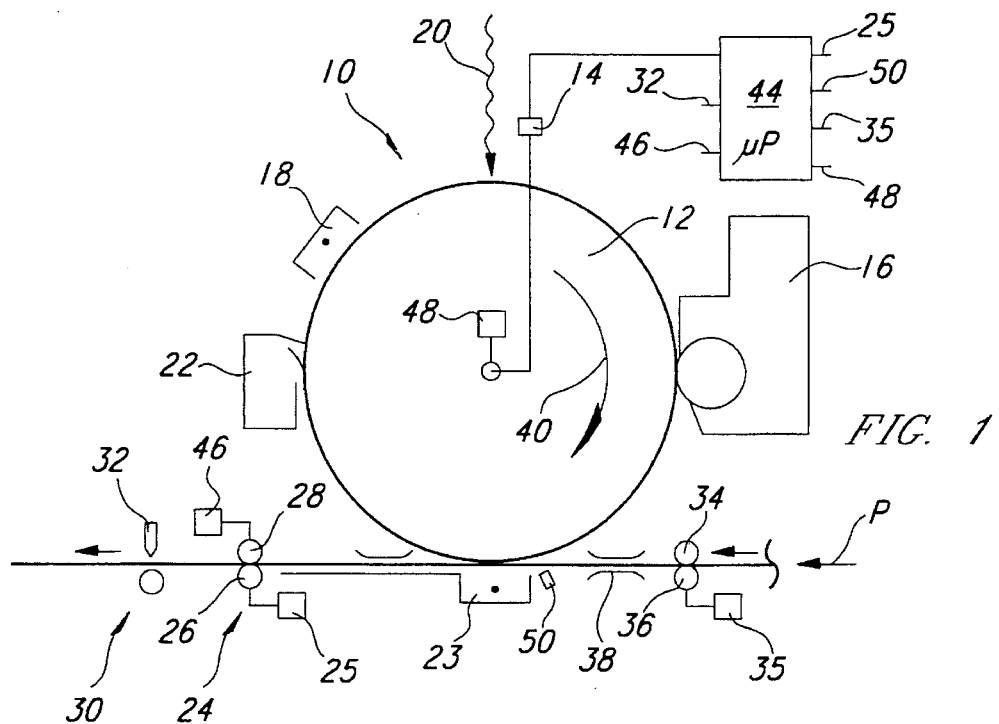
FIG. 1 is a schematic side elevation of a typical printing apparatus of the type using the electrophotographic process.

While the invention will be described in its preferred form with use in an electrophotographic printer of the type used for printing bar codes and having an image transport roll or drum at an image transfer station and a fusing roller at an image fixing station, it should be understood that the invention also is applicable to other types of printers which operate with a continuous form and wherein the last printed form or label at the end of a print run is located at a position spaced significantly downstream of the printing device.

For purposes of illustration, there is an image transfer or printing station 10. In the preferred embodiment, the printing station is provided with an electrophotographic printer, having an optical photoconductor transport or image transfer drum 12 provided with a rotary drive 14. As is well known, the electrophotographic printer also includes a toner applicator 16, an image generator 18, a charging electrode 20, a charge eliminator and drum cleaning unit 22, and a transfer corona generator 23. Such electrophotographic printing devices are known and further details will not be necessary for one skilled in the art.

The electrophotographic printing devices also include a fixing station 24 having a pressure roller 26 driven by a motor 25 and a heated fusing roller 28.

Downstream of the fusing station is a cutting station 30 using any well known type of separating device 32 for cutting or tearing the continuous form F, leaving a new leading edge 42. If the form employed is a perforated form the separation may occur by tearing the last printed form from the remaining continuous form.

Figure 5:
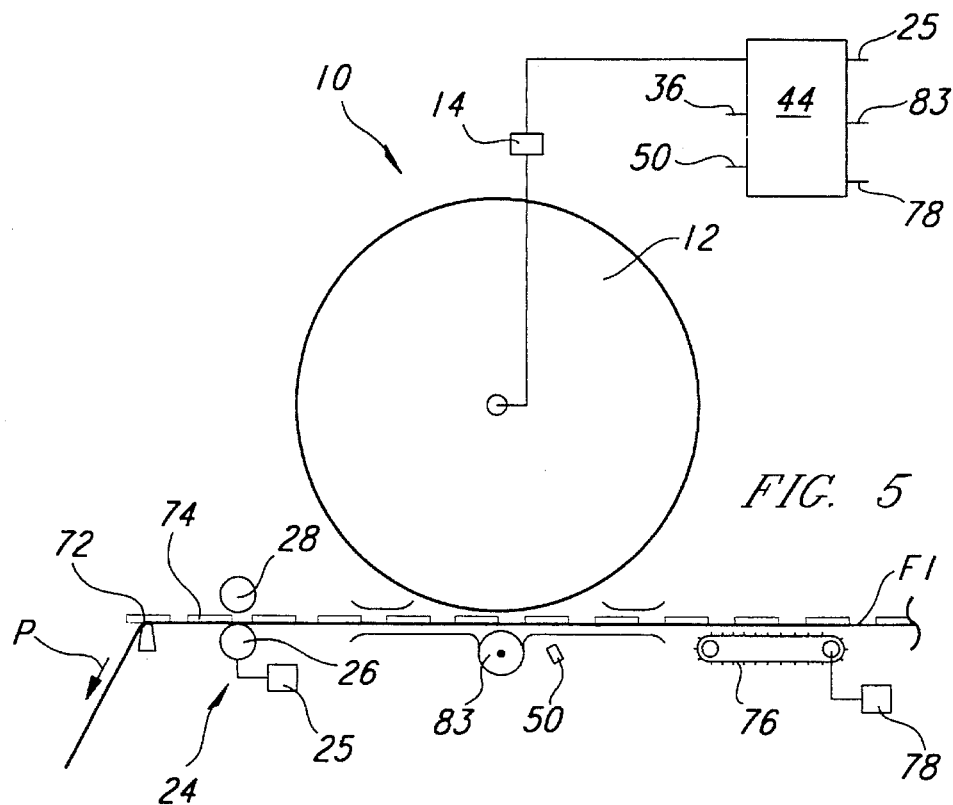
FIG. 5 shows an alternative carrier continuous form having bar code labels spaced along a continuous form.

If the continuous form is a carrier continuous form F1 (FIG. 5) having spaced labels L, the separation occurs by bending the form over a terminal plate having a smooth edge 72 over which the form is bent to separate the last printed label 74, as shown in FIG. 5, and as is well known.

In the embodiments illustrated, the feeding of the continuous form is along a path shown by the arrow P, with the form F traveling from right to left along the path as shown in FIG. 1. The form in the embodiment illustrated in FIG. 1 is driven by a drive roller 36 powered by motor 35 and a pinch roller 34 in a well-known manner. The form is fed through guides 38 which maintain the form in its path past the image transfer drum 12 and the fusing and pressure rollers 28 and 26.

Various types of printing devices may be employed and various types of continuous form drives may be employed. In the types of printing devices applicable to this invention, there is always a gap of a few (3–4) inches to several (12–15 or greater) inches between a downstream fixing station and the upstream image transfer station. Various types of printing in addition to electrophotographic, for example, are magnetographic, ionographic or electron beam printing. The electrophotographic printing may be reflective light, LED, laser, liquid crystal types of photographic transfer systems or their equivalents. Fusing or fixing devices may be heat, heat and pressure rollers, or other well-known image fixing devices. Drives for the continuous form or the carrier continuous form may be pressure and pinch rollers, pin feed drives, sprocket drives or other known drives for continuous form print media.

Figure 2:
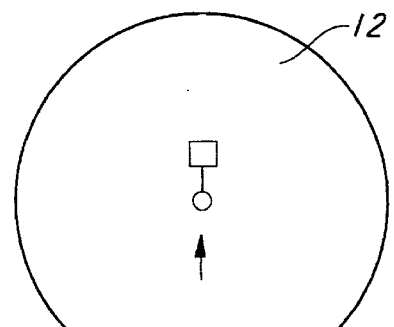
FIG. 2 is a schematic side elevation showing the last printed form being separated from the unprinted form and the unprinted form beginning to be retracted.
Figure 2:
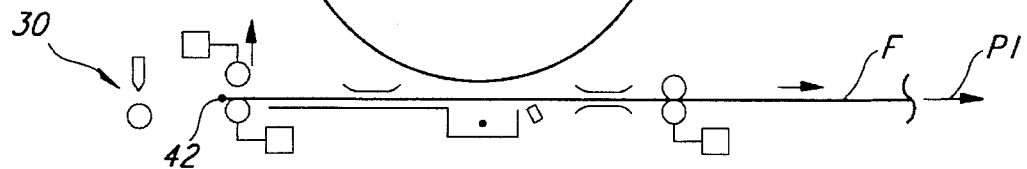
Figure 3:
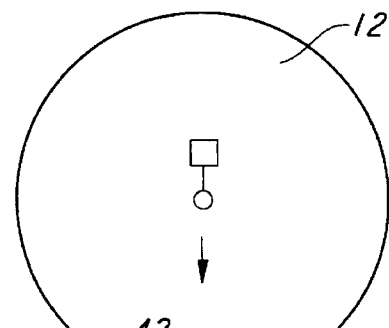
FIG. 3 is a schematic side elevation showing the new leading edge of the unprinted form in its rest position ready for the next print run and located at the printing device.
Figure 3:
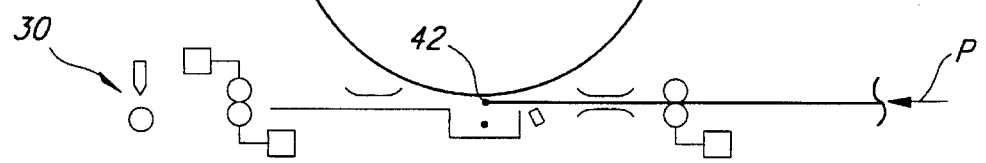

In operation of the embodiment of FIGS. 1–3, the drum 12 is rotated in the direction of the arrow 40 while the form is fed from right to left in FIG. 1. An image is deposited onto the form at the image transfer station and then downstream the image is permanently attached to the form at the fixing station 24. The printed form at the end of a run is separated from the remainder of the continuous form leaving a new leading edge 42 of the unprinted form at the fixing station.

When the last printed form has been separated, a controller for the conventional printer sends a signal to the main controller or microprocessor 44 that the new end of the form is now ready to be retracted. Solenoid 46 then opens the rollers at the fixing station 24 and a solenoid 48 lifts the drum 12 from contact with the paper at the printing station. The form is then free to be retracted in the direction P1 shown in FIG. 2. In some known image transfer and fixing devices the form or label on the form to be printed does not contact the printing or fixing devices. In these types of devices the drums and rollers need not be lifted from the form. In most all printing and fixing devices, however, the operative elements for effecting the image transfer and fixing of the image onto the form are disabled by the controller 44 to not cause unwanted transfer of toner or overheating of the continuous form.

A detector such as an optical sensor 50 detects the cut edge or new leading edge of the form when it arrives at a predetermined location immediately adjacent the image transfer drum and signals to the controller 44 to de-energize the retracting motion of the rollers 34 and 36. Thus, at this moment, the unprinted form is available immediately to begin printing. This saves and makes available the unprinted portion of the form that would have been wasted between the leading edge location at detector 50 and the separating station 30 or fixing station 24.

When the form is again fed to the left, the rollers 28 and 26 can be overdriven at a speed slightly greater than that of the rollers 34 and 36 and through a slip clutch to apply slight tension to the form and remove any slack occurring in the form.

A schematic illustration of the controller 44 for carrying out the objects of the invention is illustrated in FIG. 1. It should be understood that this is schematic only, since the details of the circuits and the controller are not necessary to an understanding of the invention and are well within the knowledge of those skilled in the art. A controller 44, which may be a conventional microprocessor, thus has inputs from the cutter 32 (when a cutter is utilized), the solenoid 46, the motor 25 for the roller 26, 28, the new leading edge detector 50, the motor 35 for the roller 34, 36, the solenoid 48 for the image transfer drum, and the drive motor 14 for the image transfer drum. As is well known in the art, the controls for the various image transfer device, such as the toner applicator 16, the image transfer device 23, the image generator 18, the charging electrode 20, the charge eliminator and drum cleaning unit 22, are also controlled by the controller as is well known in the art.

Figure 4:
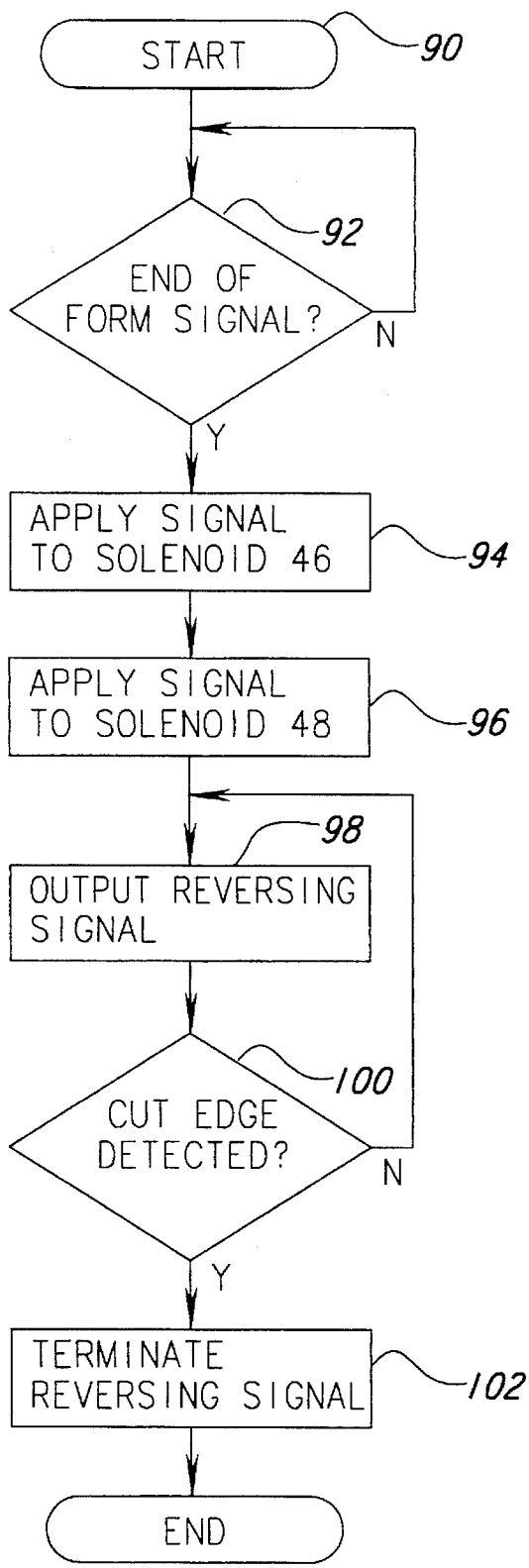
FIG. 4 is a flow chart of software for controlling the operation of the zero form loss apparatus.

A flow chart of software that would readily allow one skilled in the art to implement the controller 44 with a conventional microprocessor is illustrated in FIG. 4. The program is entered at 90 and it remains in a loop at 92 until the "End of Form" signal generated by the controller for the printer is received by the controller 44. The program then progresses to 94 where a signal is applied to the solenoid 46 to open the rollers at the fixing station. The controller 44 then outputs a signal to the solenoid 48 at program step 96 to raise the drum 12 from the paper.

The process of reversing the direction of paper travel begins at program step 98 with the controller 44 outputting a signal to the controller for the printer. The printer than rotates the drum 12 in the reverse direction until the reversing signal generated by the controller 44 terminates. The output of the optical sensor 50 is monitored at 100 until the sensor 50 generates an output when the cut edge or new leading edge of the form is adjacent the sensor 50. The program then branches to step 102 where the reversing signal to the printer controller terminates, thus halting the reverse rotation of the drum 12. The printer is then ready to begin a new printing job. At the end of the next printing job, the program shown in FIG. 4 is once again called to repeat the above-described process.

If a subsequent print run is immediately desired, and if the image transfer drum is out of contact with the form, the drum may be rotated in a normal print direction and the latent image formed, developed and moved to the transfer point aligned with the image transfer device 23 simultaneously with the retraction procedure, thus placing the latent toner image at the transfer point substantially earlier than if the start of the next print run in the advancing direction was not begun until the image transfer drum began a new cycle.

At the beginning of printing of the subsequent print runs, the form is put in motion so as to be synchronized with the drum 12 motion such that the desired start-of-print point is placed at the image transfer point just as the latent toner image is also rotated to the transfer point. The transfer corona generator 23 having been previously switched on sufficiently early to develop a desired ion flux, then pulls the toner from the drum to the form and printing proceeds normally. Also, essentially simultaneously with the arrival of the toner image and start-of-print point at the image transfer point, the drum is placed into operative engagement with the printing form. Similarly, the fuser roller is brought into contact with the form path forming a nip at or before arrival of the new leading edge of the form at the fixing station.

The invention can be equally well adapted to additional alternative electrophotographic component embodiments such as flash or vapor fusers or electrostatic transfer rollers. In the case of an electrostatic transfer roller 83 (FIG. 5) which itself can drive the form at the image transfer drum, the drive rollers 34, 36 may be optionally retracted and the form feed can be provided at the nip between the electrostatic transfer roller and the image transfer drum 12.

Figure 6:
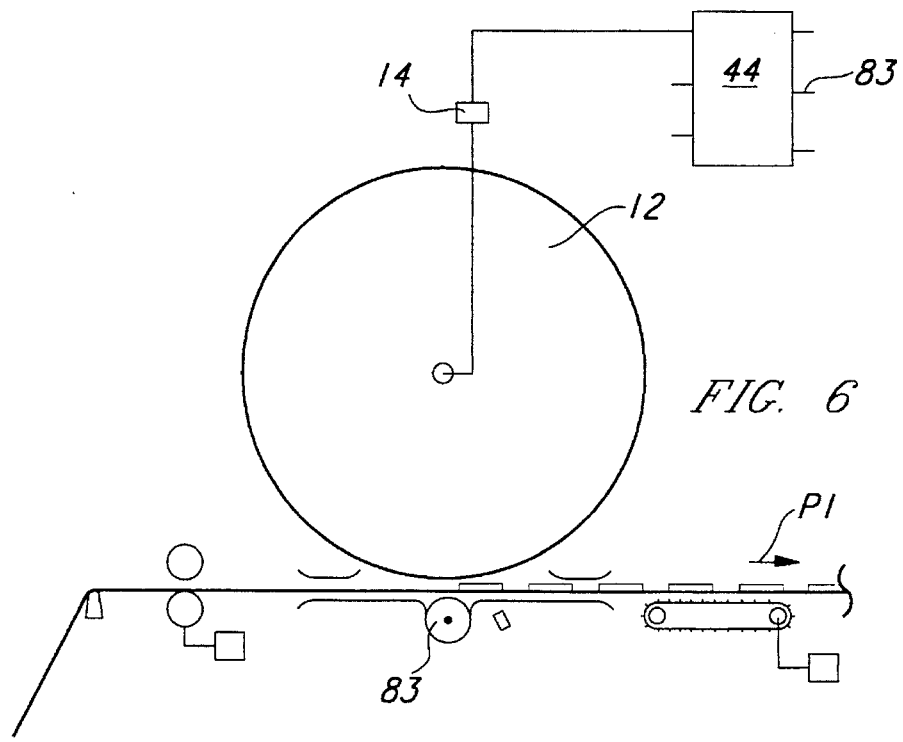
FIG. 6 shows the carrier continuous form being reversed with the last printed label detached and the last unprinted label moved upstream to the image transfer station.

The embodiment of FIGS. 5 and 6 more specifically is illustrated to show another of the numerous variations applicable to the invention while still embodying the principles of the invention. In this embodiment, for example, a pin tractor drive 76 of well-known construction has pins that mesh in edge holes in the form in a well-known manner. The drive is powered by motor 78 controlled by controller 44. A charged electrostatic transfer roller 83 is substituted for the ion transfer corona generator 23 and can itself be a form-feeding device since it is in contact with the form and forms a nip between the roller 83 and the drum 12. In this embodiment, the roller 83 may be overdriven at a speed slightly greater than the speed of the pin drive 76 and through a slip clutch in a well-known manner to assure slack is removed from the form prior to depositing an image on the form.

The controller 44 for the embodiment of FIGS. 5 and 6 can be implemented in essentially the same manner as the controller 44 of FIGS. 1–3 with appropriate modifications to the program shown in FIG. 4 which will be apparent to one skilled in the art.

While the preferred embodiment of the invention has been illustrated and described, it should be understood that through the variations will be apparent to one of ordinary skill in the art. Accordingly, the invention is not to be limited to the specific embodiments illustrated in the drawings.

What is claimed is:

1. In a continuous form printing apparatus having an image transfer station with an image transfer drum, an image fixing station with a fixing roll, and a form-feeding mechanism for feeding the form along a path past the image transfer station and then past the image fixing station during a print run leaving at an end of a print run a length of unprinted form spaced downstream of the image transfer station between the image transfer station and the fixing station, a control system for the form-feeding mechanism, comprising:

a signaling circuit that provides a signal that indicates the end of a print run with an unprinted portion of the form located at a position spaced downstream from the image transfer station between the image transfer station and art end of the form, the signal being provided only after a printed form has been separated from the unprinted portion without being automatically separated by an automatic separation mechanism;

a controlling and retracting assembly coupled to said signaling circuit that controls the form-feeding mechanism to advance the form through the image transfer and fusing stations, and in response to said signal for the end of a print run, retracting the form to bring the next-to-be-printed unprinted portion of the form rearwardly in the direction of movement of the form feed to a rest position in which the end of the form is positioned adjacent the image transfer drum, said controlling and retracting assembly performing such retracting only after the printed form has been separated from the unprinted portion without being automatically separated;

a disabling assembly coupled to said controlling and retracting assembly that disables the operative components at the image transfer and image fixing stations from operative engagement with the form for said retracting movement; and an optical detector circuit coupled to said controlling and retracting assembly that optically detects when the end of the form is positioned adjacent the image transfer drum and then provides an output signal to said controlling and retracting assembly, which in response thereto, halts such retracting of the form and directs said disabling assembly to enable the operative components of the image transfer and image fixing stations to operatively engage with the form.

2. The apparatus of claim 1, said form-feeding mechanism including a drive roll and a pinch roll located upstream in the direction of form feed from the image transfer station.

3. The apparatus of claim 1 wherein said continuous form is a print receiving media, and further including non-automatic means downstream of said fixing station for allowing the last printed portion of the form to be separated from the remainder of the form leaving a new leading edge, said optical detector circuit detecting the new leading edge and providing the output signal to said controlling and retracting assembly which retracts the new leading edge to a position adjacent to the image transfer drum.

4. The apparatus of claim 1 wherein said continuous form is a carrier continuous form having spaced labels attached thereto, and further including means downstream of said fixing station for separating the last printed label from the carrier continuous form leaving a next-to-be-printed label adjacent thereto, said means for retracting the form retracting the form to position the next-to-be-printed label adjacent to the image transfer drum.

5. The apparatus of claim 3 wherein the printer is a bar code printer.

6. The apparatus of claim 4 wherein the printer is a bar code printer.

7. An apparatus for printing on a continuous form and positioning an unprinted portion of the form relative to a printing device, comprising:

means for feeding a continuous form along a path past a printing device for depositing an image on the form;

an image fixing device positioned along the path spaced downstream of the printing device, the image fixing device for fixing an image on a last printed portion of the form leaving an elongated unprinted portion of the form between the fixing device and the printing device;

a signaling circuit for signaling that the last primed portion of the form has been separated from the form, the signaling circuit providing a signal only after the last printed portion of the form has been separated from the form without being automatically cut by an automatic cutting mechanism; and a retracting assembly coupled to the signaling circuit for retracting the form until a most downstream unprinted portion of the form is adjacent to the printing device in response to the signal from the signaling circuit, the retracting assembly performing such retraction of the form only after the last printed portion of the form has been separated from the unprinted portion without being automatically cut, the retracting assembly including an optical detector circuit that optically detects when the most downstream unprinted portion of the form is positioned adjacent to the printing device and causes such retraction to halt in response thereto.

8. The apparatus of claim 7 wherein said printing device is a bar code printing device.

9. A method of printing on a last unprinted portion of a continuous form at an end of a print run relative to a printing image transfer station, comprising:

feeding the form along a predetermined path past an image transfer station where an image is deposited on the form and then past a fixing station, where the image is permanently attached to the form;

detecting when the end of a print run has occurred by detecting that a last printed portion of the form has been separated from a remainder of the continuous form without such separation being caused by an automatic separation device, to thereby leave a next-to-be-printed portion of the form between the image transfer station and an edge of the form;

retracting the form rearwardly along said path;

optically detecting the edge of the next-to-be-printed portion of the form; and halting the retracting of the form rearwardly along the path so that the edge of the next-to-be-printed portion of the form is located adjacent to said image transfer station.

10. The method of claim 9, said image fixing station including an image fusing roll that engages the form, said step of retracting the form including removing the image fusing roller from contact with the form.

11. The method of claim 9 wherein said image transfer station includes a bar code printer.

12. The method of claim 9 wherein the last printed portion of the form has an image fixed directly to the form, and including the step of separating the form downstream of the image fixing station to leave a new leading edge of the form adjacent to the next-to-be-printed portion of the form, said step of retracting the form including retracting the form until the new leading edge of the form is adjacent to the transfer drum.

13. The method of claim 9 wherein the continuous form is a carrier continuous form having a plurality of labels attached thereto spaced along said form, the images being printed on said labels, said step of separating the last printed portion of the form including the step of separating the last printed label from the form leaving the next-to-be-printed label on the form, said step of retracting the form rearwardly including retracting the form until the next-to-be-printed label is adjacent to the image transfer drum.

* * * * *

UNITED STATES PATENT AND TRADEMARK OFFICE
CERTIFICATE OF CORRECTION

PATENT NO.    : 5,581,293
DATED         : December 3, 1996
INVENTOR(S)   : Christopher A. Wiklof It is certified that error appears in the above identified patent and that said Letters Patent is hereby corrected as shown below:

In column 5, claim 1, line 31, please delete "art" and substitute therefor -- an --.

In column 6, claim 4, lines 12 and 13, please delete the second occurrence of "retracting the form".

Signed and Sealed this

Twenty-ninth Day of July, 1997

Attest:

BRUCE LEHMAN

*Attesting Officer*    *Commissioner of Patents and Trademarks*